(12) United States Patent
Vivanco et al.

(10) Patent No.: US 9,877,204 B1
(45) Date of Patent: Jan. 23, 2018

(54) SYSTEMS AND METHODS FOR A MULTI-LAYER TRACKING AREA CODE ASSIGNMENT

(71) Applicant: Sprint Spectrum LP, Overland Park, KS (US)

(72) Inventors: Daniel Vivanco, Sterling, VA (US); Krishna Sitaram, Chantilly, VA (US); Chunmei Liu, Great Falls, VA (US); Hemanth Pawar, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/509,275

(22) Filed: Oct. 8, 2014

(51) Int. Cl.
*H04W 16/18* (2009.01)
*H04W 68/00* (2009.01)

(52) U.S. Cl.
CPC ............ *H04W 16/18* (2013.01); *H04W 68/00* (2013.01)

(58) Field of Classification Search
CPC ..... H04W 24/02; H04W 4/021; H04W 4/028; H04W 16/18; H04W 68/00
See application file for complete search history.

(56) References Cited

U.S. PATENT DOCUMENTS

| 8,346,280 B2 | 1/2013 | DaSilva et al. |
| 2014/0038620 A1 | 2/2014 | Hedberg et al. |
| 2015/0146566 A1* | 5/2015 | Guan .................... H04W 24/02 370/254 |

FOREIGN PATENT DOCUMENTS

| CN | 102958156 | * | 3/2013 | ............ H04W 68/00 |
| KR | 20140104224 A | * | 8/2014 | |

* cited by examiner

*Primary Examiner* — Raymond Dean

(57) ABSTRACT

Systems and methods for determining a multi-layer tracking area code assignment in a wireless communication network are disclosed. A controller node is configured assign a first code to a first group of access nodes located in a geographic area. A signal load of updates for the first group of access nodes is monitored by the communication network. The controller node determines a set of criteria for assigning a second code to at least one access node in a second group of access nodes. The second group of access nodes are located in the same geographic area as the first group of access nodes. The controller node assigns the second code to the at least one access node for a predetermined period of time.

12 Claims, 7 Drawing Sheets

SYSTEMS AND METHODS FOR A MULTI-LAYER TRACKING AREA CODE ASSIGNMENT

TECHNICAL BACKGROUND

Wireless devices can enter a lower power state, or idle mode, when not involved in an active communication session, for example, to conserve network resources as well as to conserve power storage on the wireless device. To notify a wireless device in the idle state of the arrival of data for delivery to the wireless device, the communication system can send a paging message to the wireless device. For example, a controller node, such as a mobility management entity, can store an identity of the last known access node that the wireless device was in communication with (when it entered the idle mode) and send a first paging message to the last known access node. If the wireless device does not respond to the first paging message, a second paging message can be sent to a group of access nodes, referred to as a tracking area. Tracking areas are configured by the communication network provider.

The group of access nodes comprising the tracking area are each assigned a tracking area identifier (TAI), which is broadcast by each access node over the communication network. When a mobile wireless device detects a new TAI, the wireless device sends a tracking area update (TAU) message to the communication network to indicate its new tracking area. Tracking area dimensioning must be carefully considered by the network operator. When a tracking area is too large, paging operations generate substantial network signaling overhead. When a tracking area is too small, wireless devices send TAU messages more frequently, also generating substantial network signaling overhead, as well as negatively affecting power storage and processing of the wireless device.

OVERVIEW

In operation, the communication network may assign a first code to a first group of access nodes located in a geographic area. The communication network may monitor a signal load of updates for the first group of access nodes. A set of criteria for assigning a second code to at least one access node in a second group of access nodes that are located in the geographic area may be determined by the communication network. The communication network may assign the second code to the at least one access node for a predetermined period of time.

DETAILED DESCRIPTION

Figure 1A:
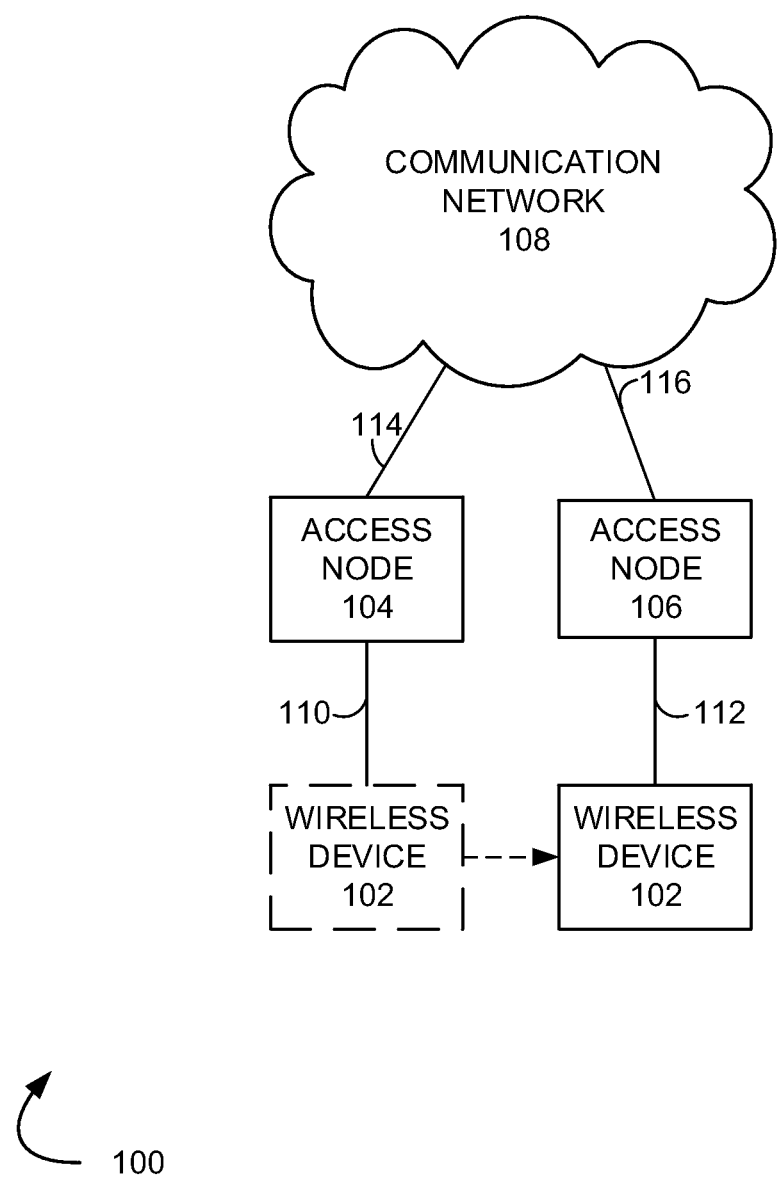
FIGS. 1A-1C illustrate an exemplary communication system for assigning tracking area codes to access nodes in a communication network.

FIG. 1 illustrates an exemplary communication system 100 for assigning tracking area codes to access nodes in a wireless communication network. Communication system 100 can comprise a wireless device 102, access nodes 104, 106, and communication network 108. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 104, 106 and communication network 108 which are omitted for clarity, including additional processing nodes, routers, gateways, and physical and/or wireless data links for carrying data among the various network elements.

Wireless device 102 can be any device configured to communicate over system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device 102 is illustrated in FIG. 1 as being in communication with each of access nodes 104, 106, any number of wireless devices can be implemented according to various exemplary embodiments disclosed herein.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access nodes 104, 106 can be any network node configured to provide communication between wireless device 102 and communication network 108. Access nodes 104, 106 can be short range access nodes or standard access nodes. A short range access node could include a microcell base station, a picocell base station, a femtocell base station, or the like and a standard access node could include a base transceiver station, a radio base station, an NodeB device, or an enhanced NodeB (eNodeB) device, or the like. It is noted that while two access nodes 104, 106 are illustrated in FIG. 1, any number of access nodes can be implemented within system 100.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying data, for example, to support voice, push-to-talk, broadcast video, and data communications by a wireless device, such as wireless device 102. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev.

A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

Communication links 110, 112, 114, 116 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 110, 112, 114, 116 can be a direct link or might include various equipment, intermediate components, systems, and networks.

Figure 1B:
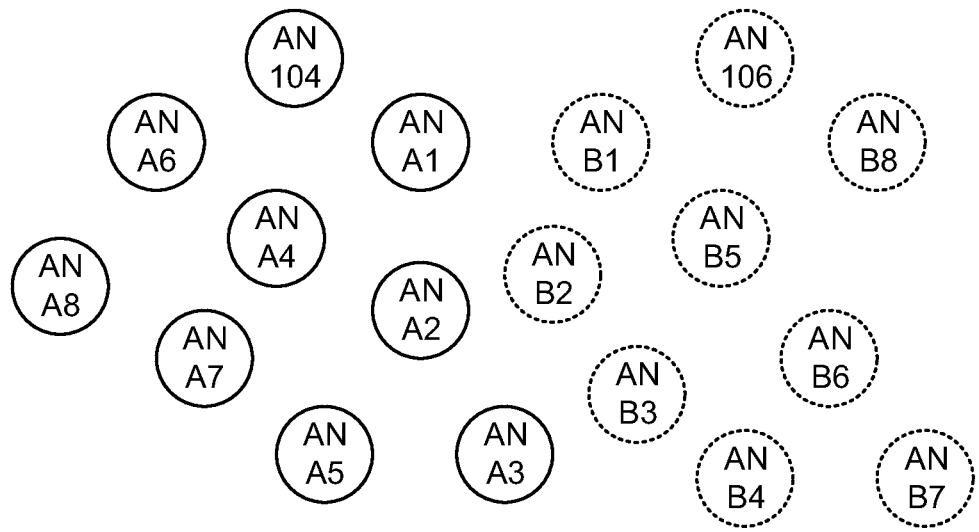
Figure 1C:
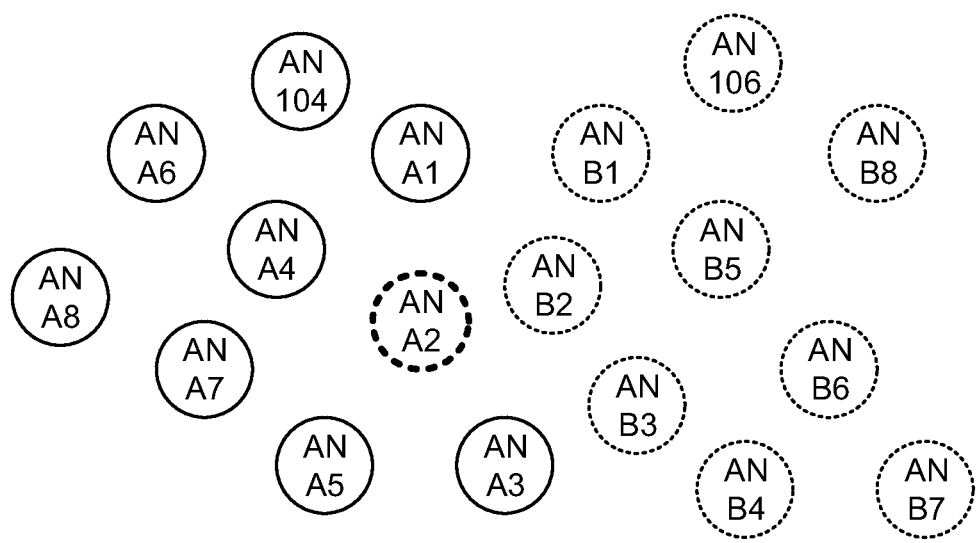

In operation, a wireless device 102 can initially be connected to access node 104 and enter a lower power state, for example, an idle mode or sleep mode where the wireless device 102 is not in continuous communication with access node 104. Referring to FIGS. 1B and 1C, a cluster of access nodes having the same tracking area code (TAC) may be configured as a tracking area by a communication network provider. In an exemplary embodiment, for example, access node 104 may be configured as a first tracking area A, along with other access nodes A1-A8. The communication network 108 may assign a first TAC to access nodes 104 and A1-A8. Access node 106 may be configured as a second tracking area B, along with other access nodes B1-B8. The communication network 108 may assign a second TAC to access nodes 106 and B1-B8. As illustrated in FIG. 1C, the association of one access node, for example, access node A2 can be changed from the first tracking area A to the second tracking area B by the communication network 108.

Each access node 104, A1-A8, 106, B1-B8 can broadcast information to the communication network 108 identifying itself, including a tracking area identifier (TAI). The TAI can be global unique identifier that includes the TAC, mobile network code (MNC), and mobile country code (MCC) of access node 104, A1-A8, 106, B1-B8. When a wireless device 102 detects a new TAI, the wireless device 102 can send a tracking area update (TAU) message to the communication network 108 indicating its new tracking area.

In another exemplary embodiment, tracking area dimensioning is considered by the network provider to reach an optimal balance of paging signaling generated by access nodes 104, A1-A8, 106, B1-B8 and TAU signaling generated by wireless devices 102. For example, when a tracking area is too large, paging operations by access nodes 104, A1-A8, 106, B1-B8 generate substantial network signaling overhead. When a tracking area is too small, the wireless device 102 may send TAU messages more frequently, generating substantial network signaling overhead, and negatively affecting the power storage and processing of the wireless device 102.

Network development and/or expansion can further complicate the configuring of tracking areas. For example, short range access nodes (e.g., microcell base stations, picocell base station, femtocell base stations, etc.) are rapidly deployable because of their small size, and can be used to expand, extend, or fill in a coverage area of communication network 108. Because the number of TACs that can be supported within the same service area (e.g., Public Land Mobile Network) are limited, the network provider first assigns the TACs to groups of standard access nodes (e.g., base transceiver stations, radio base stations, NodeB devices, eNodeB devices, etc.). The remaining unassigned TACs are then allocated to groups of short range access nodes. Because the TACs are limited, it is challenging to deploy short range access nodes in the same service area as standard access. In addition, configuring and reconfiguring tracking areas as additional short range access nodes are deployed within a service area slows network development and improper tracking area configuration creates inefficiencies in network signaling overhead and/or demands on the wireless device 102. It is desirable to use a multi-layer TAC assignment methodology to allocate available TACs to standard access nodes and short range access nodes operating in the same service area.

Figure 2:
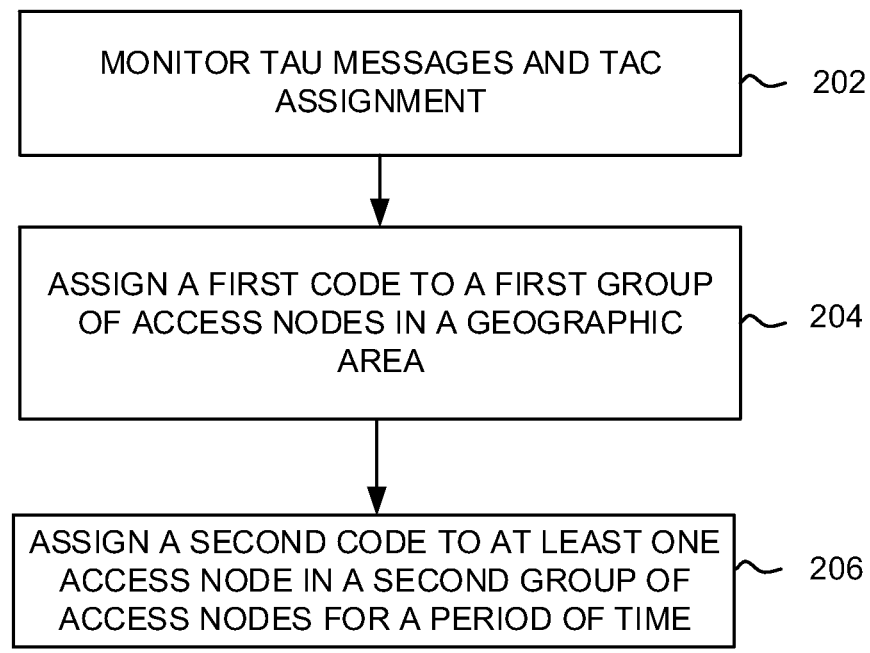
FIG. 2 illustrates an exemplary method for assigning tracking area codes to access nodes in a communication network.

FIG. 2 illustrates a flow chart of an exemplary method for assigning TACs to access nodes in a communication network. The method will be discussed with reference to the exemplary communication system 100 illustrated in FIGS. 1A-1C. In addition, although FIG. 2 depicts steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 2, when a wireless device 102 moves from a first tracking area A to a second tracking area B, the wireless device 102 can send a tracking area update (TAU) message to the communication network 108.

At step 202, a network node can monitor TAU messages received from access nodes in a geographical area and the number of TACs being assigned to short range access nodes and standard access nodes in the same geographic area. For example, tracking area dimensioning is considered by the network provider to reach an optimal balance of paging signaling generated by short range access nodes A1-A8, B1-B8 and standard access nodes 104, 106 and TAU signaling generated by wireless device 102. Because the number of TACs that can be supported within the geographic area are limited, the network provider first assigns the TACs to groups of standard access nodes 104, 106. The remaining unassigned TACs are then allocated to groups of short range access nodes A1-A8, B1-B8.

In an exemplary embodiment, the communication network 108 uses a multi-layer TAC assignment methodology to allocate available TACs to standard access nodes 104, 106 and short range access nodes A1-A8, B1-B8 operating in the same geographic area. The communication network 108 monitors the signaling load of the paging messages and TAUs received at standard access nodes 104, 106 and stores the data at a network node. The network node uses the monitored data to track the number of TACs assigned to a first group of access nodes, e.g., a group of standard access nodes 104, 106 located within a geographic area. For example, the assigned TACs may be used to define a geographical tracking area boundary and coverage area for the standard group of access nodes 104, 106. The network node can track a second group of access nodes, e.g., a group of short range access nodes A1-A8, B1-B8 located within the geographical coverage area of the standard group of access nodes 104, 106 and allocate the remaining unassigned TACs to the group of short range access nodes A1-A8, B1-B8.

At step 204, the network node can first assign TACs to a first group of access nodes in a geographic area. For example, in an exemplary embodiment, the network node can consider the historical data of the signaling load for paging generated by the group of standard access nodes 104, 106 and TAU messages received from wireless device 102 during an hour of interest. The network node uses the historical data to determine minimal TACs required by the group of standard access nodes 104, 106. The network node assigns the TACs to the group of standard access nodes 104, 106 while minimizing the use of available TACs. The remaining unassigned TACs may be allocated for the group of short range access nodes A1-A8, B1-B8.

In another exemplary embodiment, the network node may assign TACs to the group of standard access nodes 104, 106 ahead of time since the deployment of standard access nodes 104, 106 is predictable.

At step 206, the network node can assign TACs to at least one access node in a second group of access nodes located in a geographic area. For example, in an exemplary embodiment, the network node assigns TACs to the group of standard access nodes 104, 106 while minimizing the use of available TACs. The network node can dynamically allocate the remaining number of available TACs to at least one access node, for example A2, in the group of short range access nodes A1-A8, B1-B8. When a paging signaling by the group of standard access nodes 104, 106 is high, the network node may be conservative in assigning TACs to the group of short range access nodes A1-A8, B1-B8. For example, the network node may minimize the number of TACs assigned to the group of short range access nodes A1-A8, B1-B8 by assigning, for example, the TAC to only one access node A2. This maximizes the number of TACs used. When the TAU messages received from wireless device 102 is high, the network node may be aggressive in assigning TAUs to the group of short range access nodes A1-A8, B1-B8. For example, the network node may assign a TAC to a plurality of access nodes in the group of short range access nodes A1-A8, B1-B8 in a given tracking area. This minimizes the number of TACs used.

Unlike the group of standard access nodes 104, 106, assigning fixed TACs to the group of short range access nodes A1-A8, B1-B8 ahead of time is difficult since deployment of the short range access nodes A1-A8, B1-B8 is unpredictable.

One skilled in the art, using the disclosure provided herein, will appreciate that various steps of the methods can be omitted, rearranged, combined and/or adapted in various ways and can be completed by multiple wireless devices and access nodes.

Figure 3:
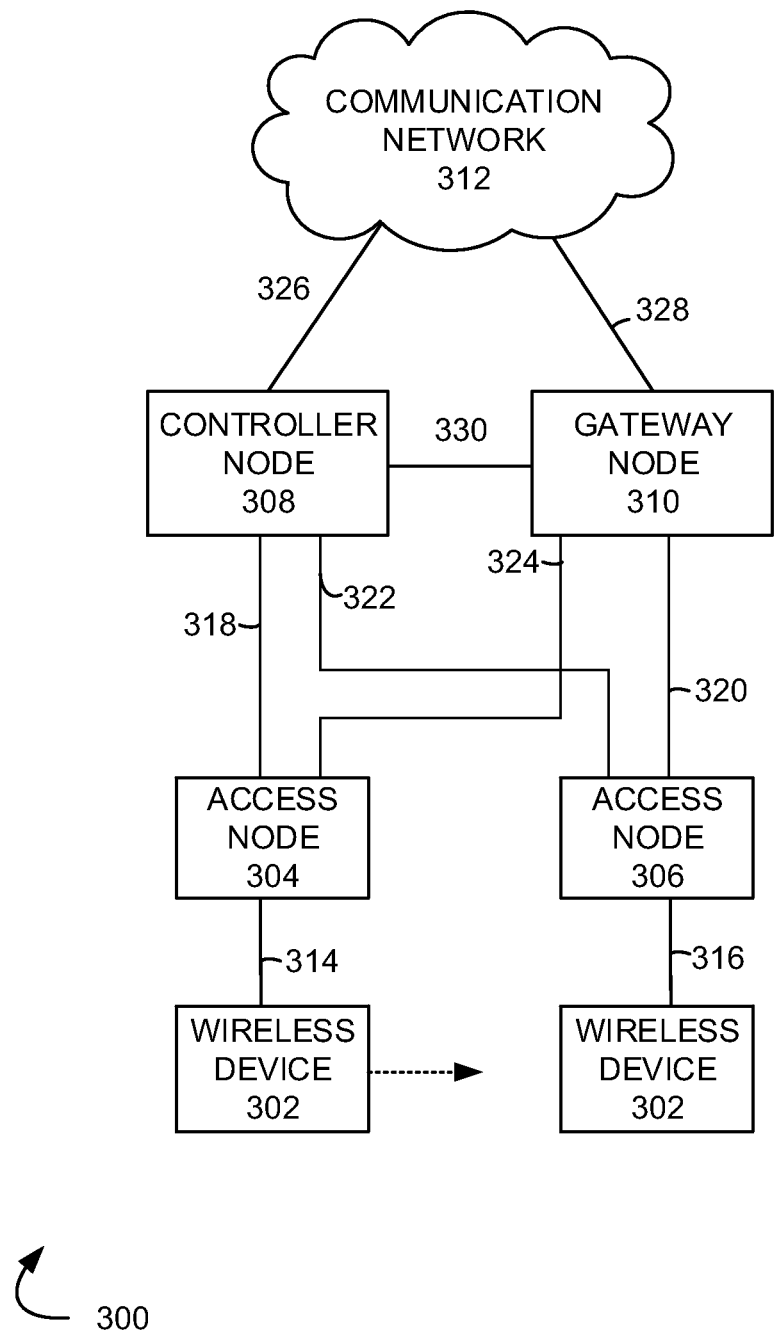
FIG. 3 illustrates another exemplary communication system for assigning tracking area codes to access nodes in a communication network.

FIG. 3 illustrates another exemplary communication system 300 for assigning TACs to access nodes in a communication network. Communication system 300 can comprise wireless device 302, access nodes 304, 306, controller node 308, gateway node 310, and communication network 312. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 304, 306 and communication network 312, which are omitted for clarity, including additional processing nodes, routers, gateways, and physical and/or wireless data links for carrying data among the various network elements.

Wireless device 302 can be any device configured to communicate over communication network 300 using a wireless interface. For example, wireless device 302 can include a remote terminal unit, a cell phone, a smart phone, a computing platform such as a laptop, palmtop, or a tablet, a personal digital assistant, or an internet access device, and combinations thereof. Wireless device 302 can communicate with access node 304 over communication link 314 and with access node 306 over communication link 316. Access nodes 304, 306 can comprise proximate access nodes, and when wireless device 302 is mobile, wireless device 302 can be instructed to change from communicating with access node 304 to communicating with access node 306, for example, through the performance of a handover, cell reselection, and the like.

Access nodes 304, 306 can be any network node configured to provide communication between wireless device 302 and communication network 312. Access node 304, 306 can be macrocell access nodes such as a base transceiver station, a radio base station, an eNodeB device, or an enhanced eNodeB device, or the like or short range access node such as a microcell base station, a picocell base station, a femtocell base station, or the like such as a home eNodeB or a home eNodeB device. In addition, a wireless device configured to enter a hotspot mode can be a femtocell access node. It is noted that while two access nodes 104, 106 are illustrated in FIG. 3, any number of access nodes can be implemented within system 300. Access nodes 304, 306, can be in communication with controller node 308 over communication links 318, 322, respectively, and with gateway node 310 over communication links 320, 324, respectively.

Controller node 308 can be any network node configured to communicate information and/or control information over communication system 300. Controller node 308 can be configured to transmit control information associated with a handover procedure and TAC assignment procedure. Controller node 308 can be a standalone computing device, computing system, or network component, and can be accessible, for example, by a wired or wireless connection, or through an indirect connection such as through a computer network or communication network. For example, a controller node 308 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 308 is not limited to any specific technology architecture, such as Long Term Evolution (LTE) and can be used with any network architecture and/or protocol.

Controller node 308 can comprise a processor and associated circuitry to execute or direct the execution of computer-readable instructions to obtain information. Controller node 308 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 308 can receive instructions and other input at a user interface. Controller node 308 can be in communication with communication network 312 over communication link 326, and with gateway node 310 over communication link 330.

Gateway node 310 can be any network node configured to interface with other network nodes using various protocols that communicates, routes, and forwards communication data addressed to wireless device 302. In addition, gateway node 310 can at as a mobility anchor for wireless device 302 during handovers between different frequencies and/or different radio access technologies supported by the same access node. Gateway node 310 can be a standalone computing device, computing system, or network component, and can be accessible, for example, by a wired or wireless connection, or through an indirect connection such as through a computer network or communication network. For example, gateway node 310 can include a serving gateway (SGW) and/or public data network gateway (PGW), etc. One of ordinary skill in the art would recognize that gateway node 310 is not limited to any specific technology architecture, such as Long Term Evolution (LTE) and can be used with any network architecture and/or protocol.

Gateway node 310 can comprise a processor and associated circuitry to execute or direct the execution of computer-readable instructions to obtain information. Gateway node 310 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 310 can receive instructions and other input at a user interface. Gateway node 310 can be in communication with communication network 312 over communication link 328.

Communication network 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 312 can be capable of carrying data, for example, to support voice, push-to-talk, broadcast video, and data communications by a wireless device such as wireless device 302. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 312 can also comprise additional base stations, controller nodes, telephony switches, internet routers, network gateways, computer systems, communication link, or some other type of communication equipment, and combinations thereof.

Communication links 314, 316, 318, 320, 322, 324, 326, 328, 330 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMax), or Long Term Evolution (LTE), or combinations thereof. Other wireless protocols can also be used. Communication links 314, 316, 318, 320, 322, 324, 326, 328, 330 can be a direct link or might include various equipment, intermediate components, systems, and networks.

Figure 4:
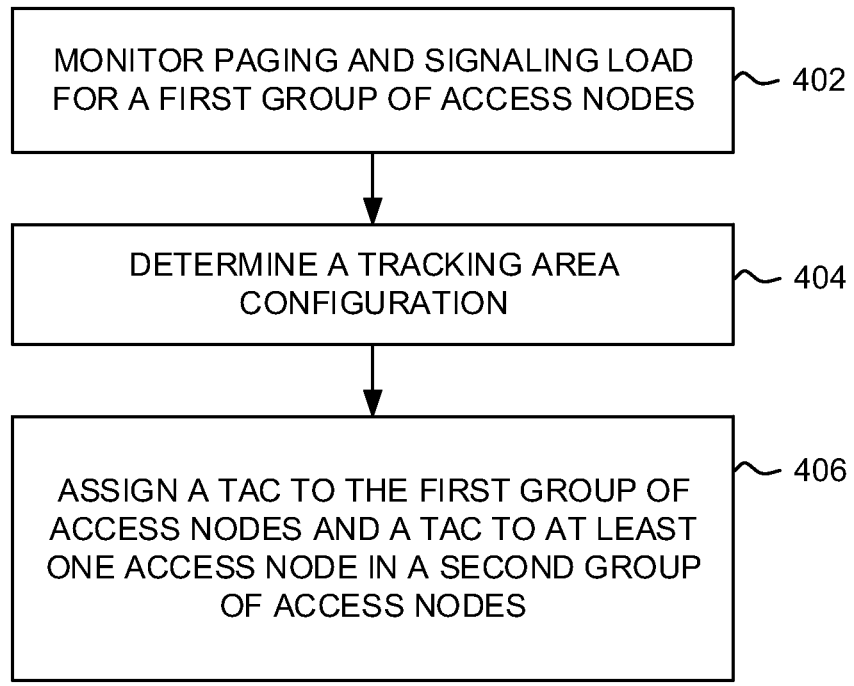
FIG. 4 illustrates another exemplary method for assigning tracking area codes to access nodes in a communication network.

FIG. 4 illustrates an exemplary method for assigning TACs to access nodes in a communication network. The method will be discussed with reference to the exemplary communication system 300 illustrated in FIG. 3 and the exemplary communication system 500 illustrated in FIGS. 5A and 5B. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Figure 5:
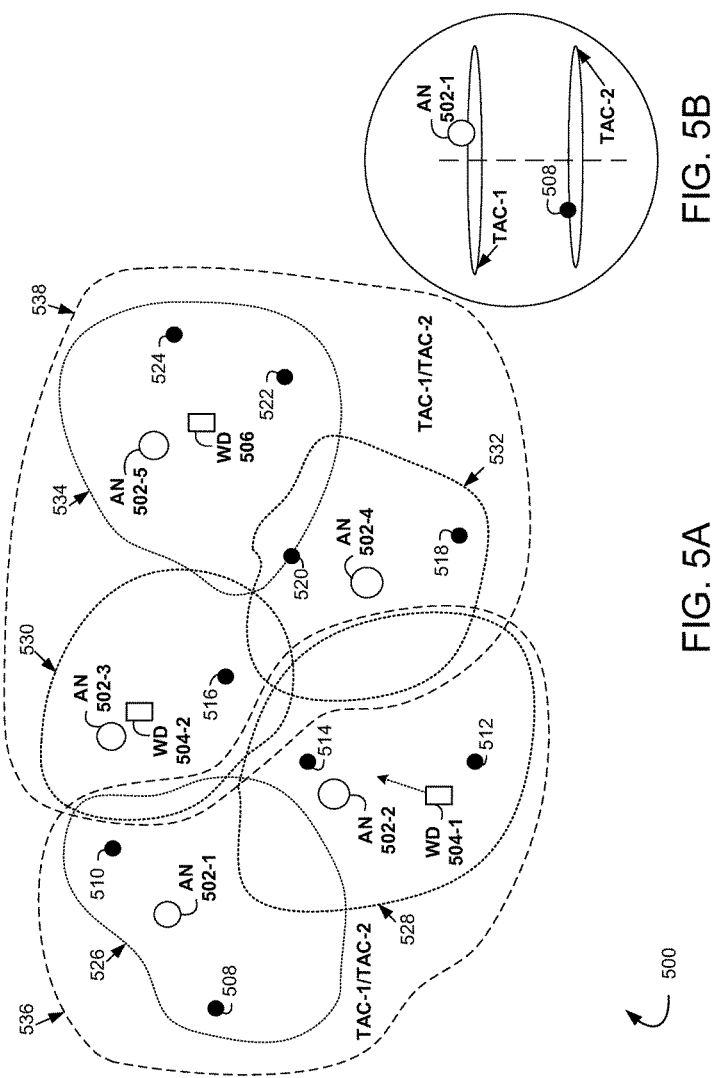
FIGS. 5A and 5B illustrate another exemplary communication system for assigning tracking area codes to access nodes in a communication network.

Referring to FIGS. 4 and 5A, at step 402, a network node monitors the signaling load of paging messages and TAUs received at a first access nodes and stores the data at a network node. For example, in an exemplary embodiment, a wireless device 504-1 initially establishes communication with standard access node 502-2. The wireless device 504-1 indicates to the communication system 500 that it is within a coverage area 528 of standard access node 502-2. The communication system 500 can determine a geographical location of the wireless device 504-1 using any number of methods including Global Positioning System (GPS) information received from the wireless device or can triangulate signals received from two or more access nodes, etc. The geographical location of the wireless device 504-1 can be stored at the network node.

The wireless device 504-1 can shift from an active mode to a lower power state, for example, an idle mode or sleep mode where the wireless device 504-1 is not in continuous communication with access node 502-2. A message for idle wireless device 504-1 can be received at access node 502-2 and a first paging message can be sent to access node 502-2. If the idle wireless device 504-1 does not respond to the first paging message within a predetermined period of time, a second paging message can be sent to a group of access nodes 502-1, 502-2, 508, 510, 512, 514 in a first geographical tracking area 536. As the wireless device 504-1 moves from the first geographical tracking area 536 to a second geographical tracking area 538, the wireless device 504-2 sends a TAU message to the communication system 500 to notify the communication system 500 of its new geographical tracking area 538.

In an exemplary embodiment, the communication system 500 monitors the signaling load of the paging messages and TAUs received from a first group of access nodes 502-1, 502-2, 502-3, 502-4, 502-5, e.g., a group of standard access nodes, and stores the data at a network node. The network node uses the data to track a number of TACs assigned to the group of standard access nodes 502-1, 502-2, 502-3, 502-4, 502-5 located within the first 536 and second 538 geographical tracking areas. For example, the assigned TACs may be used to define a geographical tracking area boundary and coverage area for each access node in the group of standard access nodes 502-1, 502-2, 502-3, 502-4, 502-5.

In another exemplary embodiment, illustrated in FIGS. 5A and 5B, the network node may implement a multi-layer TAC assignment methodology to allocate available TACs to the group of standard access nodes 502-1, 502-2, 502-3, 502-4, 502-5 located within the geographic coverage areas 536, 538 and to a second group of access nodes 508, 510, 512, 514, 516, 518, 520, 522, 524, e.g., a group of short range access nodes, located within the same geographic coverage areas 536, 538 on different layers TAC-1, TAC-2, respectively.

At step 404, a network node determines a geographical tracking area configuration for the groups of access nodes. For example, in an exemplary embodiment, the network node collects the historical data of the signaling load for paging generated by the group of standard access nodes 502-1, 502-2, 502-3, 502-4, 502-5, and the TAU messages received from multiple wireless devices 504-1 during an hour of interest. This data is used by the network node to determine the minimum number of TACs required by the group of standard access node 502-1, 502-2, 502-3, 502-4, 502-5 and an optimum configuration of, for example, the first geographical tracking area 536 and second geographical tracking area 538 during the hour of interest ($M_t$). The remaining unassigned TACs may be allocated to the group of short range access nodes 508, 510, 512, 514, 516, 518, 520, 522, 524.

The total number of TACs as defined in 3GPP Standard is 65,535 (T). In another exemplary embodiment, a maximum value can be applied to $M_t$ to ensure there are sufficient TACs remaining for assignment to the group of short range access nodes 508, 510, 512, 514, 516, 518, 520, 522, 524.

In another exemplary embodiment, the geographical tracking area configuration of the group of standard access nodes 502-1, 502-2, 502-3, 502-4, 502-5, once determined, can be systematically applied at the hour of interest since the group of standard access nodes 502-1, 502-2, 502-3, 502-4, 502-5 are predictable. This assumes that there are no significant changes in standard access node counts/traffic.

At step 406, as illustrated in FIGS. 5A and 5B, a network node assigns a TAC to a first group of access nodes on a first layer TAC-1 and a TAC to at least one access node in a second group of access nodes on a second layer TAC-2. For example, in an exemplary embodiment, the network node assigns TACs to the group of standard access nodes 502-1, 502-2, 502-3, 502-4, 502-5 on a first layer TAC-1 while minimizing the use of available TACs. The network node can dynamically allocate the remaining number of available TACs to the group of short range access nodes 508, 510, 512, 514, 516, 518, 520, 522, 524 on a second layer TAC-2. When paging signaling by the group of standard access nodes 502-1, 502-2, 502-3, 502-4, 502-5 is high, the network node may be conservative in assigning TACs to the group of short range access nodes 508, 510, 512, 514, 516, 518, 520, 522, 524. The network node may minimize the number of TACs assigned to the group of short range access nodes 508, 510, 512, 514, 516, 518, 520, 522, 524 by assigning, for example, the TAC to only one access node 508 in geographical tracking areas 536, 538. This maximizes the number of TACs used. When the TAU messages received from wireless devices 504-1, 504-2, 506 are high, the network node may be aggressive in assigning TACs to the group of short range access nodes 508, 510, 512, 514, 516, 518, 520, 522, 524. The network node may assign a TAC to a plurality of access nodes in the group of short range access nodes 508, 510, 512, 514, 516, 518, 520, 522, 524 on the second layer TAC-2 in geographical tracking areas 536, 538. This minimizes the number of TACs used.

In an exemplary embodiment, the network node determines the most optimum configuration of geographical tracking areas 536, 538 and assigns TACs to the group of standard access nodes 502-1, 502-2, 502-3, 502-4, 502-5 using the minimum number of TACs required. The remaining TACs are assigned to at least one access node, for example, access node 508, in the group of short range access nodes 508, 510, 512, 514, 516, 518, 520, 522, 524 for a corresponding hour of interest ($R_t = T - M_t$).

In another exemplary embodiment, the network node considers the impact of the signaling load for paging and TAU messages on the group of standard access nodes 502-1, 502-2, 502-3, 502-4, 502-5 and determines an assignable paging load. The assignable paging load can be allocated to the group of short range access nodes 508, 510, 512, 514, 516, 518, 520, 522, 524. For example, if the total allowable paging load for communication system 500 is approximately eighty percent (80%) and the group of standard access nodes 502-1, 502-2, 502-3, 502-4, 502-5 has a paging load of approximately fifty percent (50%), then the network node can allocate thirty percent (30%) of the total allowable paging load to the group of short range access nodes 508, 510, 512, 514, 516, 518, 520, 522, 524.

In another exemplary embodiment, the TAC assignments for the group of short range access nodes 508, 510, 512, 514, 516, 518, 520, 522, 524 can be based on a coverage area 526, 528, 530, 532, 534 of the group of standard access nodes 502-1, 502-2, 502-3, 502-4, 502-5 and the number of access nodes in the standard group of access nodes 502-1, 502-2, 502-3, 502-4, 502-5. For example, the number of access nodes in the standard group of access nodes 502-1, 502-2, 502-3, 502-4, 502-5 can vary depending on the signaling load in communication system 500 and depending on the number of access nodes in the group of short range access nodes 508, 510, 512, 514, 516, 518, 520, 522, 524 covered by coverage areas 526, 528, 530, 532, 534. The network node can also assign TACs to select access nodes in the underlying TAC-2group of short range access nodes 508, 510, 512, 514, 516, 518, 520, 522, 524 based on the paging signal load and TAU signal load of the group of short range access node 508, 510, 512, 514, 516, 518, 520, 522, 524 received in the coverage areas 526, 528, 530, 532, 534.

In another exemplary embodiment, the group of standard access node 502-1, 502-2, 502-3, 502-4, 502-5 and short range access nodes 508, 510, 512, 514, 516, 518, 520, 522, 524 located in geographical tracking area 536 are assigned the same TAC. For example, a large number of short range access nodes 508, 510 from the group of short range access nodes 508, 510, 512, 514, 516, 518, 520, 522, 524 can be located in the same geographical tracking area 536 as standard access node 502-1. Short range access nodes 508, 510 may have a high paging signal load. A large number of short range access nodes 512, 514 from the group of short range access nodes 508, 510, 512, 514, 516, 518, 520, 522, 524 can be located in the same geographical 536 as standard access node 502-2. Short range access nodes 512, 514 may have a high paging signal load. A small number of access nodes 516 from the group of short range access nodes 508, 510, 512, 514, 516, 518, 520, 522, 524 can be located in the same geographical tracking area 538 as access node 502-3.

Short range access nodes 516 may have a low paging signal load. A large number of access nodes 518, 520 from the group of short range access nodes 508, 510, 512, 514, 516, 518, 520, 522, 524 can be located in the same geographical tracking area 538 as access node 502-4. Short range access nodes 518, 520 may have a low paging signal load. A large number of access nodes 522, 524 from the group of short range access nodes 508, 510, 512, 514, 516, 518, 520, 522, 524 can be located in the same geographical tracking area 538 as access node 502-5. Short range access nodes 522, 524 may have a low paging signal load. The network node can determine the most efficient configurations, where signaling load for paging and TAUs are at a minimum at the same time, to ensure TACs are not exhausted. For example, in an exemplary embodiment, short range access nodes 508, 510, 512, 514 may be assigned the same TAC (TAC-2) and access nodes 516, 518, 520, 522, 524 may be assigned the same TAC (TAC-1).

In another exemplary embodiment, the network node can balance the paging load and TAUs based on statistical data such as handover matrices to reduce TAUs and paging statistics. This procedure can be repeated on a configurable time basis, e.g., hourly, daily, etc.

One skilled in the art, using the disclosure provided herein, will appreciate that various steps of the methods can be omitted, rearranged, combined and/or adapted in various ways and can be completed by multiple wireless devices and access nodes.

Figure 6:
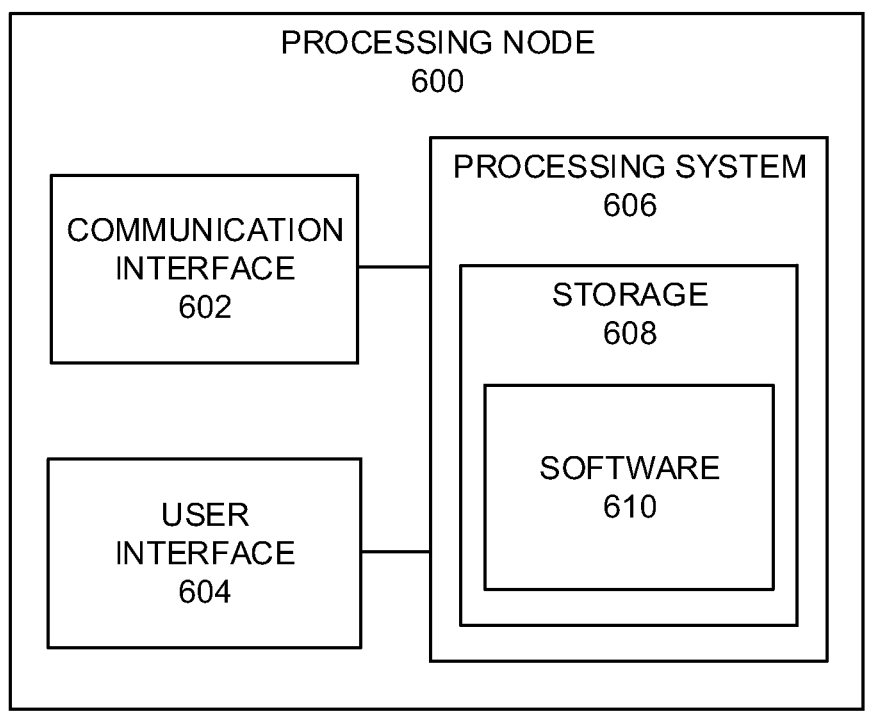
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104, 106, A1-A8, B1-B8, 304, 306, 502-1, 502-2, 502-3, 502-4, 502-5, 508, 510, 512, 514, 516, 518, 520, 522, 524, gateway node 310, and controller node 308. Processing node 600 can also be an adjunct or component of a network element, 104, 106, A1-A8, B1-B8, 304, 306, 502-1, 502-2, 502-3, 502-4, 502-5, 508, 510, 512, 514, 516, 518, 520, 522, 524, gateway node 310, and controller node 308. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a multi-layer tracking area code ("TAC") assignment in a wireless network, the method comprising:
creating, at a network node, a first grouping of access nodes located within a geographic area;
allocating, statically, a first code to the first grouping of access nodes on a first TAC layer of the multi-layer TAC assignment, the first code being used to define a geographical tracking area boundary;
monitoring a signal load of updates for the first grouping of access nodes;
creating, at the network node, a second grouping of access nodes located within the geographical tracking area boundary defined by the first code, the second grouping of access nodes being different from the first grouping of access nodes; and
allocating, dynamically, a second code to at least one access node of the second grouping of access nodes on a second TAC layer of the multi-layer TAC assignment for a period of time, the second TAC layer being a different TAC layer from the first TAC layer and assigned based on an impact of paging load and tracking area updates ("TAUs"), wherein the paging load and TAUs are balanced by the network node, based on statistical data comprising handover matrices, to reduce TAUs and paging.

2. The method of claim 1, wherein the first grouping of access nodes are standard access nodes and the second grouping of access nodes are short range access nodes.

3. The method of claim 1, wherein the period of time is an hour of interest.

4. The method of claim 3, wherein the first codes are allocated to the first grouping of access nodes and the second codes are allocated to the second grouping of access nodes during a corresponding hour of interest.

5. The method of claim 1, wherein the signal load comprises hourly historic data for paging messages sent by the first grouping of access nodes and tracking area updates received from a wireless device.

6. The method of claim 1, wherein the impact of paging load and TAUs is based on the first grouping of access nodes.

7. A system for determining a multi-layer tracking area code ("TAC") assignment in a wireless network, the system comprising:
a controller configured to:
create, at a network node, a first grouping of access nodes located within a geographic area;
allocate, statically, a first code to the first grouping of access nodes on a first TAC layer of the multi-layer TAC assignment, the first code being used to define a geographical tracking area boundary;
monitor a signal load of updates for the first grouping of access nodes;
create, at the network node, a second grouping of access nodes located within the geographical tracking area boundary defined by the first code, the second grouping of access nodes being different from the first grouping of access nodes; and
allocate, dynamically, a second code to at least one access node of the second grouping of access nodes on a second TAC layer of the multi-layer TAC assignment for a period of time, the second TAC layer being a different TAC layer from the first TAC layer and assigned based on an impact of paging load and tracking area updates ("TAUs"),
wherein the paging load and TAUs are balanced by the controller, based on statistical data comprising handover matrices, to reduce TAUs and paging.

8. The system of claim 7, wherein the first grouping of access nodes are standard access nodes and the second grouping of access nodes are short range access nodes.

9. The system of claim 7, wherein the period of time is an hour of interest.

10. The system of claim 9, wherein the first codes are allocated to the first grouping of access nodes and the second codes are allocated to the second grouping of access nodes during a corresponding hour of interest.

11. The system of claim 7, wherein the signal load comprises hourly historic data for paging messages sent by the first grouping of access nodes and tracking area updates received from a wireless device.

12. The system of claim 7, wherein TAUs is based on the first grouping of access nodes.

* * * * *